United States Patent
Tschirschke

(10) Patent No.: US 9,488,096 B2
(45) Date of Patent: Nov. 8, 2016

(54) ACTUATING FORCE TRANSMITTING DEVICE OF AN EXHAUST-GAS TURBOCHARGER

(75) Inventor: Jürgen Tschirschke, Hettenleidelheim (DE)

(73) Assignee: BorgWarner Inc., Auburn Hills, MI (US)

( * ) Notice: Subject to any disclaimer, the term of this patent is extended or adjusted under 35 U.S.C. 154(b) by 496 days.

(21) Appl. No.: 14/130,750

(22) PCT Filed: Jul. 11, 2012

(86) PCT No.: PCT/US2012/046165
§ 371 (c)(1),
(2), (4) Date: Jan. 3, 2014

(87) PCT Pub. No.: WO2013/015985
PCT Pub. Date: Jan. 31, 2013

(65) Prior Publication Data
US 2014/0140831 A1    May 22, 2014

(30) Foreign Application Priority Data

Jul. 28, 2011 (DE) .................. 10 2011 108 888

(51) Int. Cl.
*F01D 17/16* (2006.01)
*F02B 37/00* (2006.01)
*F02B 37/18* (2006.01)

(52) U.S. Cl.
CPC ............ *F02B 37/00* (2013.01); *F02B 37/186* (2013.01); *Y02T 10/144* (2013.01)

(58) Field of Classification Search
CPC ............ F01D 17/143; F01D 17/165; F05D 2220/40; F05D 2260/40; F02B 37/186; F02B 37/24
See application file for complete search history.

(56) References Cited

U.S. PATENT DOCUMENTS

| | | | | |
|---|---|---|---|---|
| 4,490,622 A | * | 12/1984 | Osborn | F01D 25/16 290/2 |
| 6,582,190 B2 | * | 6/2003 | Jinnai | F02C 6/12 415/150 |
| 6,892,538 B2 | * | 5/2005 | Park | F01D 17/165 60/527 |
| 2005/0050888 A1 | * | 3/2005 | McEwan | F01D 17/105 60/602 |

* cited by examiner

*Primary Examiner* — Ninh H Nguyen
(74) *Attorney, Agent, or Firm* — A. Michael Tucker; Stephan A. Pendorf; Patent Central LLC

(57) ABSTRACT

An actuating force transmitting device (10) of an exhaust-gas turbocharger (1), having: a regulating rod (12) which can be displaced by an actuator (11); a guide piece (15) arranged on a free end region (14) of the regulating rod (12); and a lever (16) which is fastened to a guide piece pin (19) of the guide piece (15). There is radial play ($S_R$) between a lever bore (50) and the guide piece pin (19) which extends through the lever bore (50), and there is axial play ($S_A$) between the guide piece (15) and the lever (16). A clamping spring (20; 20'; 20") preloads the lever (16) relative to the guide piece pin (19).

11 Claims, 5 Drawing Sheets

Figure 1:
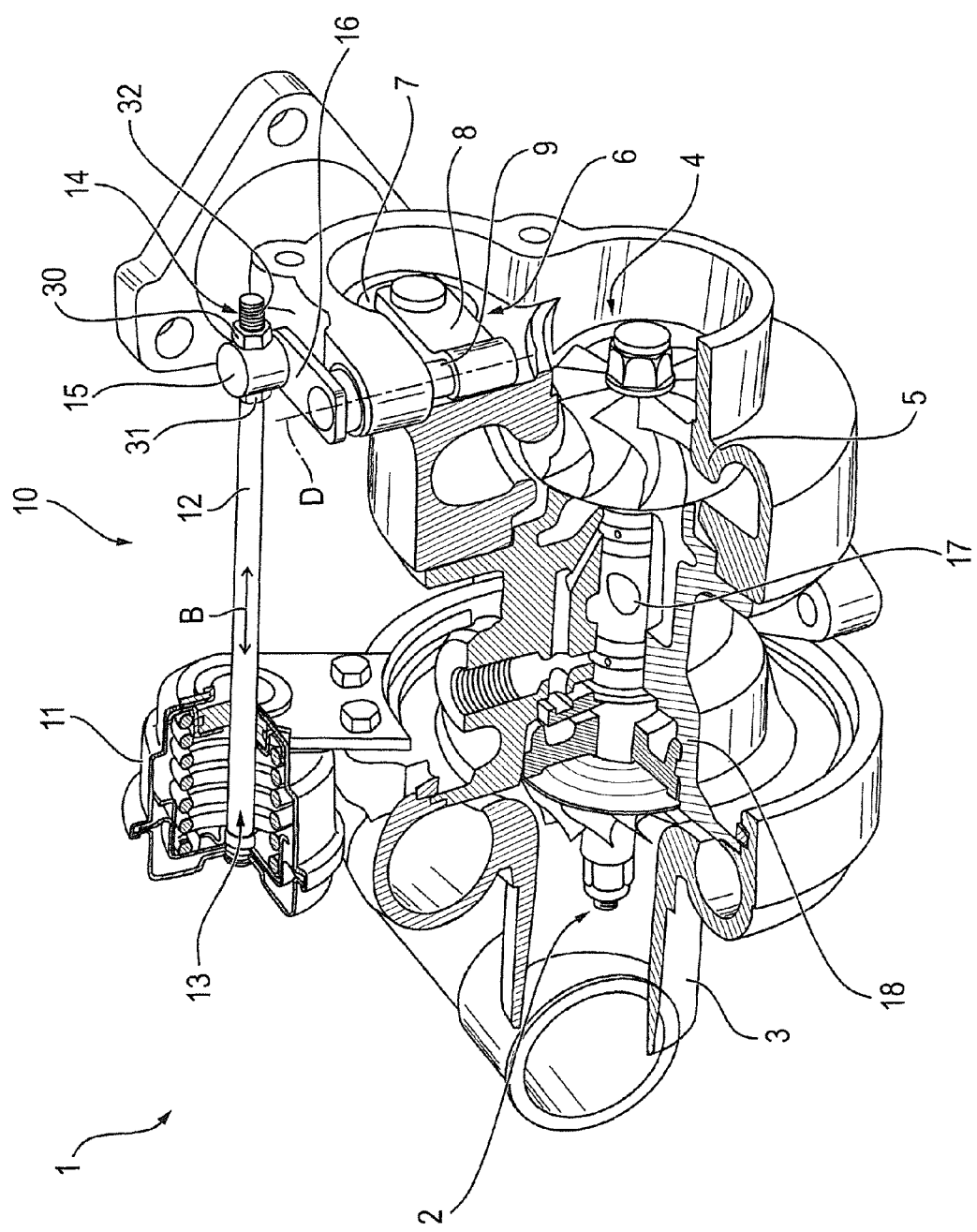

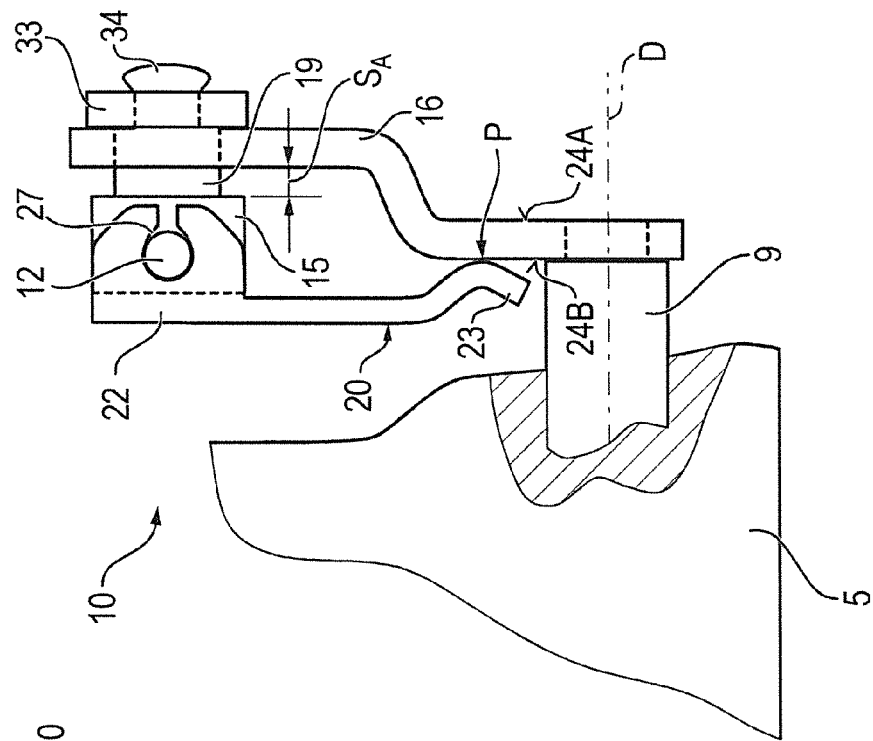
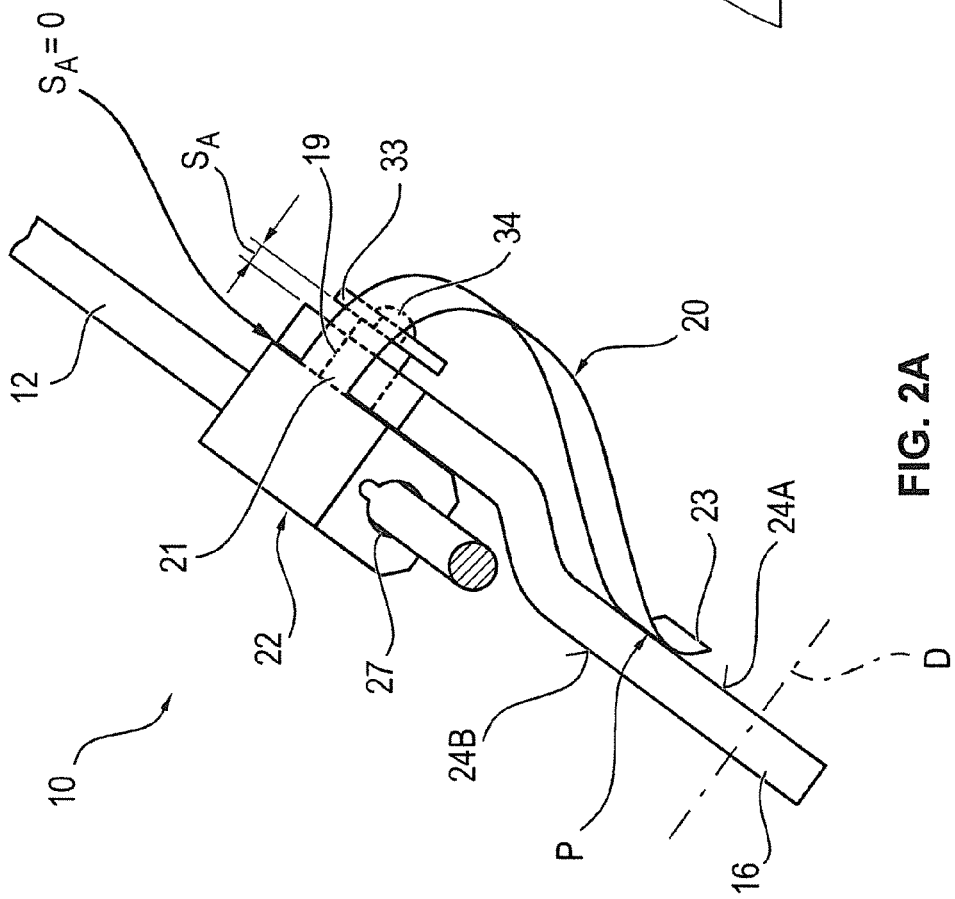

ACTUATING FORCE TRANSMITTING DEVICE OF AN EXHAUST-GAS TURBOCHARGER

The invention relates to an actuating force transmitting device of an exhaust-gas turbocharger, as per the preamble of claim 1.

To be able to actuate for example a wastegate flap arrangement of an exhaust-gas turbocharger, an actuating force transmitting device is provided which has a regulating rod which is operatively connected at one end to an actuator, for example in the form of an electric motor or a pneumatic control capsule.

Arranged on the other free end region of the regulating rod is a guide piece which is connected via a guide piece pin to a lever.

For this purpose, the lever has a lever bore through which the guide piece pin is guided, to which guide piece pin the lever can be connected for example through the provision of a rivet connection.

Radial play is provided between the lever bore and the guide piece pin in order to permit relative movement between said parts, and axial play is provided between the guide piece and the lever.

Said plays can result in a misalignment between the guide piece and the lever, wherein as a result of vibrations imparted by the engine during operation, in particular in the direction of the regulating rod, the lever bore can be subjected to such intense wear that the rivet connection fails, which can lead to failure of the exhaust-gas turbocharger as a whole.

It is therefore an object of the present invention to provide an actuating force transmitting device of an exhaust-gas turbocharger, with which it is possible to curtail or completely eliminate vibration-induced wear.

Said object is achieved by means of the features of claim 1.

As a result of the preload of the lever relative to the guide piece pin, a situation is achieved in which the axial play discussed in the introduction and preferably the radial play cannot "migrate" during operation of the exhaust-gas turbocharger but rather can be maintained at a defined position between the components to which the vibrations generated by the engine can be transmitted.

As a result, for example, the vibration-induced wear at the connection between the lever bore and the guide piece pin is at least reduced or eliminated entirely.

There is also the resulting advantage that the provision of a clamping spring does not necessitate any changes to the assembly sequence of the exhaust-gas turbocharger, and furthermore permits retrofitting.

The subclaims relate to advantageous refinements of the invention.

Claims 11 and 12 define an exhaust-gas turbocharger as an independently marketable object.

Figure 3:
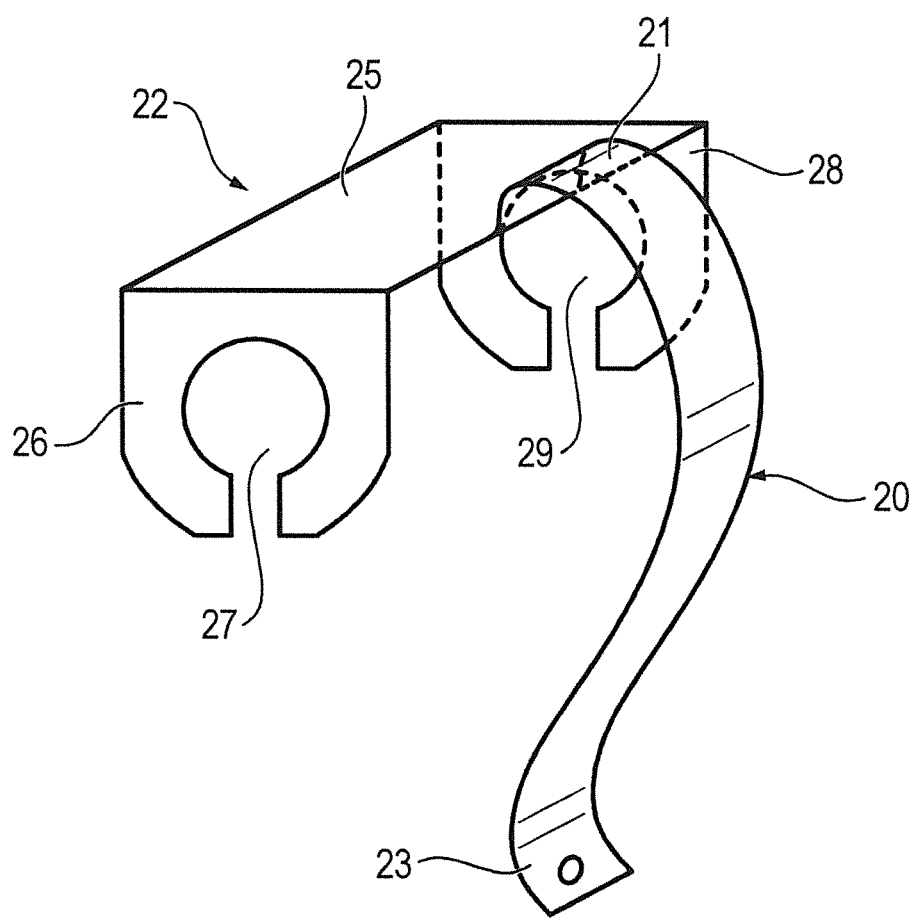
Figure 4:
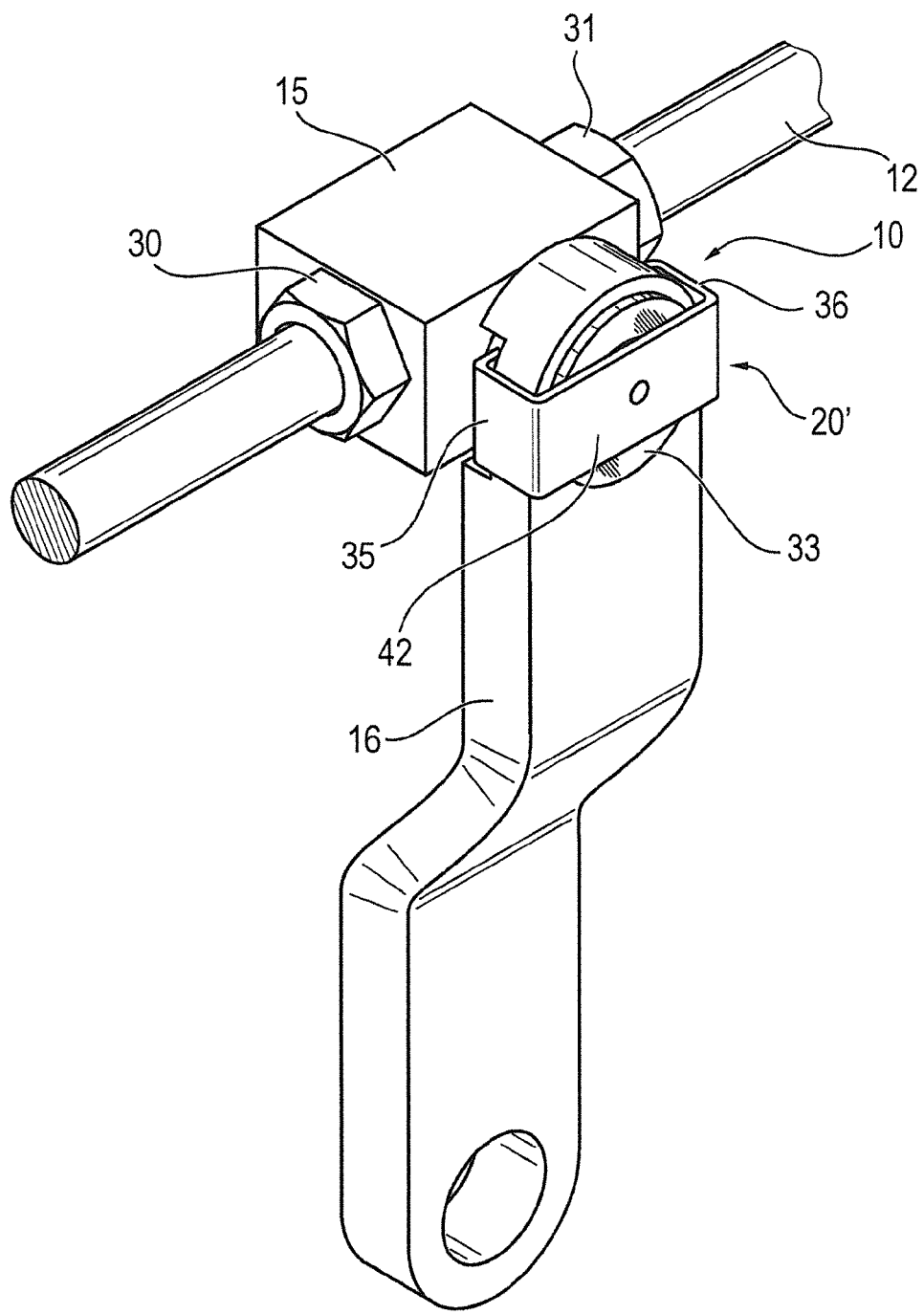
Figure 5:
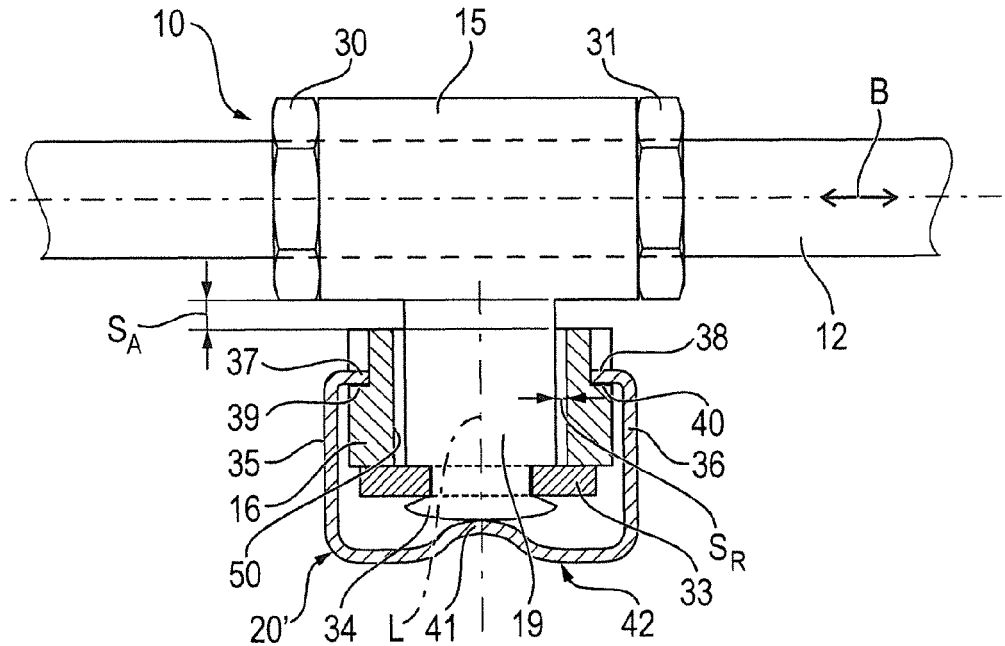
Figure 6:
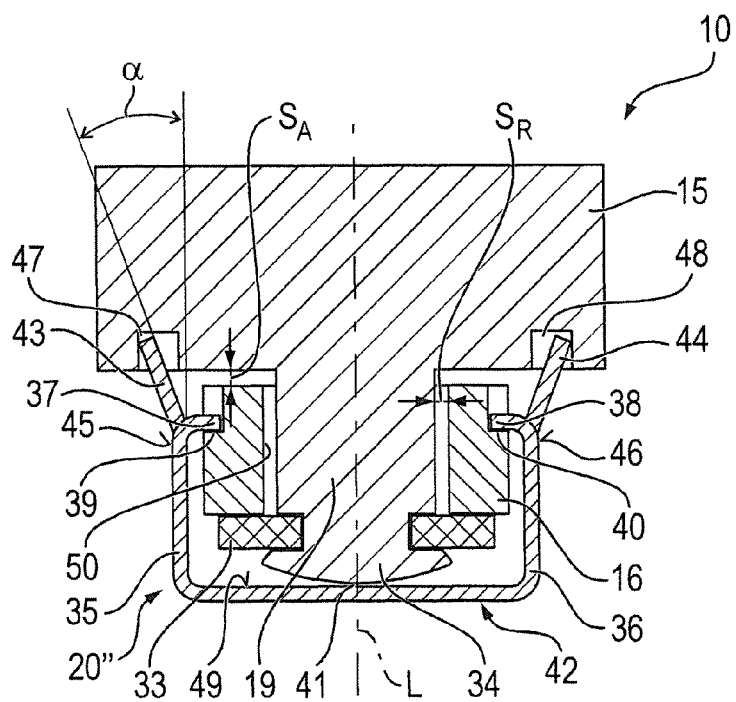

Further details, features and advantages of the invention will emerge from the following description of exemplary embodiments on the basis of the drawing, in which:

FIG. 1 shows a perspective, partially sectional illustration of an exhaust-gas turbocharger according to the invention, FIGS. 2A, 2B and 3 show schematically simplified illustrations of a first and second embodiment of the actuating force transmitting device, FIG. 4 shows a perspective, schematically simplified illustration of a third embodiment of the actuating force transmitting device according to the invention, FIG. 5 shows a partially sectional plan view of the actuating force transmitting device as per FIG. 4, and FIG. 6 shows an illustration, corresponding to FIG. 5, of a further embodiment of the actuating force transmitting device according to the invention.

FIG. 1 shows a perspective illustration of an exhaust-gas turbocharger 1 according to the invention which, as is conventional, has a compressor wheel 2 and a compressor housing 3 and a turbine wheel 4 in a turbine housing 5. The turbine housing 5 and the compressor housing 3 are connected to one another in the conventional way by means of a bearing housing 18 in which is mounted a rotor shaft 17 which, at its two free ends, bears the compressor wheel 2 and the turbine wheel 4 respectively.

In the turbine housing 5 there is provided a wastegate flap arrangement 6 for opening and closing a wastegate duct, which is not visible owing to the illustration selected in FIG. 1. Said wastegate duct, when it is opened by the wastegate flap arrangement 6, connects the turbine housing inlet to the turbine housing outlet.

The wastegate flap arrangement 6 has a flap plate 7 which is mounted on a flap lever 8. The flap lever 8 is provided with a flap shaft 9 which is guided out of the turbine housing 5 and which is connected at its end, the top end in the example, to a lever 16 of an actuating force transmitting device 10. The lever 16 of the transmitting device 10 is connected via a guide piece 15 to a regulating rod 12. At its first end region 13, the regulating rod 12 is connected to an actuator 11, and at the second free end region 14, the regulating rod 12 is connected via the guide piece 15 to the lever 16. For this purpose, the second end region 14 has, in the example, a threaded portion 32 onto which are screwed two nuts 30 and 31, between which the guide piece 15 is fixed on the end region 14.

As a result of said arrangement, the linear movement B of the regulating rod 12 is converted by means of the actuating force transmitting device into a rotational movement of the lever 16 and therefore a rotational movement of the flap shaft 9 about an axis of rotation D, such that the flap plate 7 can be pivoted away from the wastegate opening and can be pivoted toward the latter in order to close it.

Viewing FIGS. 2A and 3 together yields a first embodiment of the actuating force transmitting device 10 which can be used in the exhaust-gas turbocharger 1 illustrated in FIG. 1. Here, those parts which have already been described with reference to FIG. 1 are denoted by the same reference symbols in FIGS. 2A and 3.

Accordingly, the actuating force transmitting device 10 of the embodiment according to FIGS. 2A and 3 has a clamping spring 20 which is attached with a first end region 21 to a securing clip 22. The securing clip 22 is arranged on the regulating rod 12 and, for this purpose, has rod guides 26 and 28 in which are arranged rod recesses 27 and 29 which are slotted on one side, through which rod recesses the regulating rod 12 extends, as can be seen in FIG. 1. The two rod guides 26 and 28 are connected to one another via a connecting plate 25 on which said rod guides are arranged at least substantially at right angles. Here, the clamping spring 20 engages with its first end region 21 on the connecting plate 25 and bears with a second end region 23 against an underside 24A of the lever 16, as can be seen from FIG. 2A.

Viewing FIGS. 2A and 3 together, it can be seen that the second end region 23 is of hook-like, rounded form, so as to yield a contact point P against the underside 24A of the lever 16, such that friction arising from the relative movements occurring at said contact point is minimized in order to reduce or prevent wear.

As can be seen from FIG. 2A, in said arrangement, axial play $S_A$ is relocated into the region of a rivet washer 33 of a rivet connection, symbolized by a rivet head, between a guide piece pin (not visible in FIG. 2A) and the lever 16, whereas said axial play $S_A$ between the lever 16 and the guide piece 15, not visible in FIG. 2A owing to the arrangement of the securing clip 22 concealing it, is reduced to the value 0. This yields the advantages explained in the introduction, in particular with regard to prevention of wear or elimination of wear generated in said region by vibrations.

FIG. 2B illustrates a second embodiment of the actuating force transmitting device 10 according to the invention, wherein all of the components and parts which have already been described with reference to FIGS. 1, 2A and 3 are denoted by the same reference symbols, such that in this regard reference can be made to the description above.

FIG. 2B shows that, in said embodiment, the clamping spring 20 engages with its hook-like end region 23 on a top side or rear side 24B, which is situated opposite the underside or front side 24A, of the lever 16, such that the contact point P discussed above is again formed. In said arrangement, the play $S_A$ is again set in a defined manner in the region between the lever 16 and the guide piece 15 by the preload of the lever 16 relative to the guide piece pin 19, such that in said arrangement, too, a "migration" of the play $S_A$ and the associated problem of frictional wear can be eliminated.

Viewing FIGS. 4 and 5 together yields a further embodiment of the actuating force transmitting device 10 according to the invention.

In this regard, FIG. 4 again shows the regulating rod 12 with the guide piece 15 which is fastened to the regulating rod 12 by means of the screws 30 and 31 already described with reference to FIG. 1. The embodiment as per FIGS. 4 and 5 differs from that of FIG. 2 by the design of the clamping spring, which in this embodiment is denoted by the reference numeral 20'.

As can be seen in detail from the illustration of FIG. 5, said clamping spring 20' is in the form of a bracket which has two bracket limbs 35 and 36. The bracket limbs 35 and 36 are connected to one another by means of a connecting limb 42, so as to yield the U-shaped configuration that can be seen in FIG. 5. The bracket limbs 35 and 36 are provided with hook-like end regions 37 and 38 respectively. Said hook-like end regions 37 and 38 engage behind associated abutment shoulders 39 and 40 respectively of the lever 16. In the embodiment illustrated in FIG. 5, the lever 16 is connected to the guide piece pin 19 by means of the above-described rivet washer 33 and the formation of a rivet head 34. As is also shown in FIG. 5, the rivet head 34 is preloaded against an abutment 41 of the connecting limb 42 under the action of the clamping spring 20', said abutment being of domed design in the example in order to reduce wear between said rivet head and abutment, wherein the dome extends inward in the direction of the rivet head 34.

The elimination of vibration-induced wear is achieved in this embodiment in that the lever 16 is pulled toward the abutment 41 under the action of the clamping spring 20', and the axial play $S_A$ between the lever 16 and the guide piece 15 is thus set.

FIG. 6 shows a further embodiment of the actuating force transmitting device 10 according to the invention. To simplify said illustration, the regulating rod 12 with its nuts 30 and 31, as shown in FIG. 5, are not shown again.

The embodiment as per FIG. 6 differs from that of FIG. 5 in that radial damping is provided in addition to the axial damping. Said radial damping is achieved in that the clamping spring 20" has two webs 43 and 44 which project from outer surfaces 45 and 46 respectively of the bracket limbs 35 and 36 in the region of the hook-like end regions 37 and 38 respectively. Here, the webs 43 and 44 engage into associated grooves 47 and 48 respectively of the guide piece 15, such that it is possible for the inner surface of the lever bore 50 to be kept at a distance, which corresponds to the play $S_R$, from the outer surface of the guide piece pin 19.

As FIG. 6 also shows, the webs 43 and 44 are arranged at an acute angle α with respect to the longitudinal axis L of the guide piece pin 19, which is shown by way of example for both webs on the basis of the web 43.

In contrast to the embodiment according to FIG. 5, it is furthermore the case that the inner wall 49 of the connecting limb 42 is not of domed design. However, the rivet head 34 is of domed design, such that a contact point against the inner wall 49 is generated as an abutment 41, which contact point likewise contributes at least to a reduction of friction and wear.

It must however be emphasized that the embodiment of FIG. 6 may also be formed with the domed abutment 41 as per FIG. 5.

The embodiment of FIG. 6 otherwise corresponds to that of FIG. 5, such that with regard to the components and the mode of operation, reference may be made to the above description.

In addition to the above written disclosure, reference is hereby made explicitly to the diagrammatic illustration thereof in FIGS. 1 to 6.

LIST OF REFERENCE NUMERALS

1 Exhaust-gas turbocharger
2 Compressor wheel
3 Compressor housing
4 Turbine wheel
5 Turbine housing
6 Wastegate flap arrangement
7 Flap plate
8 Flap lever
9 Flap shaft
10 Actuating force transmitting device
11 Actuator
12 Regulating rod
13 First end region
14 Second end region
15 Guide piece
16 Lever
17 Rotor shaft
18 Bearing housing
19 Guide pin
20, 20', 20" Clamping spring
21 First end region
22 Securing clip
23 Second end region
24A Underside/front side
24B Top side/rear side
25 Connecting plate
26, 28 Rod guides
27, 29 Rod recesses
30, 31 Nuts
32 Threaded portion
33 Rivet washer
34 Rivet head 35, 36 Bracket limb
37, 38 End regions
39, 40 Abutment shoulders
41 Abutment
42 Connecting limb
43, 44 Webs
45, 46 Outer surfaces
47, 48 Grooves
49 Inner wall
50 Lever bore
D Axis of rotation
L Longitudinal axis
B Movement direction
$S_A$ Axial play
$S_R$ Radial play
α Angle
P Contact point

The invention claimed is:

1. An actuating force transmitting device (10) of an exhaust-gas turbocharger (1), having
 a regulating rod (12) which can be displaced by an actuator (11);
 a guide piece (15) arranged on a free end region (14) of the regulating rod (12); and
 a lever (16) which is fastened to a guide piece pin (19) of the guide piece (15),
 wherein there is radial play ($S_R$) between a lever bore (50) and the guide piece pin (19) which extends through the lever bore (50), there is axial play ($S_A$) between the guide piece (15) and the lever (16), and there is a clamping spring (20; 20'; 20") which preloads the lever (16) relative to the guide piece pin (19).

2. The actuating force transmitting device as claimed in claim 1, wherein the clamping spring (20) is fastened with a first end region (21) to a securing clip (22) and bears with its second free end region (23) against the underside (24A) of the lever (16).

3. The actuating force transmitting device as claimed in claim 2, wherein the second end region (23) is of hook-like, rounded form.

4. The actuating force transmitting device as claimed in claim 2, wherein the securing clip (22) is arranged on the regulating rod (12) and engages over the guide piece (10) and over two nuts (30, 31) which are screwed onto a threaded portion (32) of the regulating rod (12) at both sides of the guide piece (10).

5. The actuating force transmitting device as claimed in claim 1, wherein the clamping spring (20'; 20") is a bracket which has two bracket limbs (35, 36), the hook-like end regions (37, 38) of which engage behind associated abutment shoulders (39, 40) of the lever (16) and preload the head (34) thereof against an abutment (41) of a connecting limb (42) which connects the bracket limbs (35, 36).

6. The actuating force transmitting device as claimed in claim 5, wherein the head is in the form of a rivet head (34).

7. The actuating force transmitting device as claimed in claim 5, wherein the abutment (41) is dome-shaped, directed toward the head (34) of the connecting limb (42).

8. The actuating force transmitting device as claimed in claim 5, wherein the bracket (20") has two webs (43, 44) which, in the region of the hook-like end regions (37, 38), project from outer surfaces (45 and 46 respectively) of the bracket legs (35, 36) and engage into associated grooves (47, 48) of the guide piece (15).

9. The actuating force transmitting device as claimed in claim 8, wherein the webs (43, 44) are arranged in each case at an acute angle (α) with respect to the longitudinal axis (L) of the guide piece pin (19).

10. The actuating force transmitting device as claimed in claim 5, wherein the head (34) is of domed form and the abutment (41) is an abutment point on an inner wall (49) of the connecting leg (42).

11. An exhaust-gas turbocharger (1) having an actuating force transmitting device (10) as per claim 1, wherein a clamping spring (20; 20'; 20") preloads the lever (16) relative to the guide pin (19).

* * * * *